(12) United States Patent
Matsumoto

(10) Patent No.: US 10,969,501 B2
(45) Date of Patent: Apr. 6, 2021

(54) RADIATION IMAGING APPARATUS, DRIVING METHOD THEREFOR, AND RADIATION IMAGING SYSTEM

(71) Applicant: CANON KABUSHIKI KAISHA, Tokyo (JP)

(72) Inventor: Kazumasa Matsumoto, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/655,679

(22) Filed: Oct. 17, 2019

(65) Prior Publication Data

US 2020/0049838 A1 Feb. 13, 2020

Related U.S. Application Data

(63) Continuation of application No. PCT/JP2018/007523, filed on Feb. 28, 2018.

(30) Foreign Application Priority Data

May 10, 2017 (JP) .................................. 2017-094081

(51) Int. Cl.
*G01T 1/17* (2006.01)
*H04N 5/32* (2006.01)

(52) U.S. Cl.
CPC ........... *G01T 1/17* (2013.01); *H04N 5/32* (2013.01)

(58) Field of Classification Search
CPC .......... G01T 1/17; H04N 5/32; H04N 5/3575; H04N 5/235
See application file for complete search history.

(56) References Cited

U.S. PATENT DOCUMENTS

| 8,247,779 B2 | 8/2012 | Kameshima et al. |
| 9,467,631 B2 | 10/2016 | Dowaki et al. |
| 9,482,628 B2 | 11/2016 | Naito et al. |
| 9,823,363 B2 | 11/2017 | Sato |
| 9,869,774 B2 | 1/2018 | Dowaki et al. |
| 10,104,326 B2* | 10/2018 | Hashimoto .......... H04N 5/3355 |
| 10,148,898 B2 | 12/2018 | Dowaki et al. |

(Continued)

FOREIGN PATENT DOCUMENTS

| JP | 2010-005212 | 1/2010 |
| JP | 2010-232804 | 10/2010 |

(Continued)

*Primary Examiner* — Marcus H Taningco
(74) *Attorney, Agent, or Firm* — Venable LLP

(57) ABSTRACT

A radiation imaging apparatus is provided. Each pixel includes a signal generation unit configured to generate a pixel signal, a reset unit configured to cause the signal generation unit to generate an offset signal by resetting the signal generation unit to a state before the accumulation of charges, and a holding unit. The apparatus comprises a control unit configured to control each pixel to generate the pixel signal and the offset signal in every frame period and hold the pixel signal and the offset signal in the holding unit; and a readout unit configured to read out, from the holding unit, the offset signal generated in a frame period and the pixel signal generated in accordance with charges accumulated subsequently to the generation of the offset signal, and calculate a difference between the readout offset signal and pixel signal.

11 Claims, 7 Drawing Sheets

(56) References Cited

U.S. PATENT DOCUMENTS

| | | | | |
|---|---|---|---|---|
| 2004/0189846 A1* | 9/2004 | Hiyama | ................. | H04N 5/363 |
| | | | | 348/308 |
| 2012/0201357 A1* | 8/2012 | Watanabe | ................ | H05G 1/64 |
| | | | | 378/114 |
| 2013/0140467 A1* | 6/2013 | Kitano | .............. | H01L 27/14676 |
| | | | | 250/393 |
| 2014/0124668 A1 | 5/2014 | Ikawa et al. | | |
| 2019/0094394 A1 | 3/2019 | Matsumoto | | |

FOREIGN PATENT DOCUMENTS

| | | |
|---|---|---|
| JP | 2011-120094 | 6/2011 |
| JP | 2016-039495 | 3/2016 |
| JP | 2016-092706 | 5/2016 |

* cited by examiner

RADIATION IMAGING APPARATUS, DRIVING METHOD THEREFOR, AND RADIATION IMAGING SYSTEM

CROSS-REFERENCE TO RELATED APPLICATIONS

This application is a Continuation of International Patent Application No. PCT/JP2018/007523, filed Feb. 28, 2018, which claims the benefit of Japanese Patent Application No. 2017-094081, filed May 10, 2017, both of which are hereby incorporated by reference herein in their entirety.

BACKGROUND OF THE INVENTION

Field of the Invention

The present invention relates to a radiation imaging apparatus, a driving method therefor, and a radiation imaging system.

Background Art

Large-area flat-panel radiation imaging apparatuses of equal-magnification optical systems using photoelectric conversion elements prevail for higher resolutions, smaller volumes, and less image distortions. An example of a flat panel sensor of an equal-magnification optical system used in a radiation imaging apparatus is a large-area flat panel sensor constituted by two-dimensionally connecting photoelectric conversion elements formed on a silicon semiconductor wafer by a CMOS semiconductor manufacturing process. PTL 1 discloses a radiation imaging apparatus that includes a sample and hold circuit for an optical signal and a sample and hold circuit for an offset signal in a pixel and implements one-shot exposure (electronic shutter function) on an entire sensor array, and a driving method therefor. According to this driving method, a clamp circuit is reset to a reference voltage at the start of accumulation, and a voltage of the clamp circuit that has changed from the reference voltage due to the accumulation of charges is sampled and held as an optical signal at the end of accumulation. After the sample and hold operation of the optical signal, the reference voltage is sampled and held as an offset signal. A difference between the sampled-and-held optical and offset signals, which are analog signals, is A/D-converted using XY address scanning, obtaining image data of the sensor array. The calculation of the difference between the optical and offset signals removes thermal noise at a pixel amplifier, 1/f noise, a temperature difference, and FPN arising from process variations.

A ripple component in a reference voltage generates a small voltage difference between a reference voltage at the start of accumulation and a reference voltage at the end of accumulation. This voltage difference differs between frames in the driving method described in PTL 1, and a flicker is generated as a random brightness difference between successive frames especially in the one-shot exposure method. An aspect of the present invention provides a technique for reducing a flicker.

CITATION LIST

Patent Literature

PTL 1: Japanese Patent Laid-Open No. 2016-092706

SUMMARY OF THE INVENTION

In consideration of the above problems, there is provided a radiation imaging apparatus that generates a plurality of frame images, comprising a plurality of pixels, each pixel including a signal generation unit configured to generate a pixel signal based on charges generated and accumulated in accordance with radiation, a reset unit configured to cause the signal generation unit to generate an offset signal by resetting the signal generation unit to a state before the accumulation of charges, and a holding unit capable of holding a signal, a control unit configured to control each pixel to generate the pixel signal and the offset signal in every frame period and hold the pixel signal and the offset signal in the holding unit, and a readout unit configured to read out, from the holding unit, the offset signal generated in a frame period and the pixel signal generated in accordance with charges accumulated subsequently to the generation of the offset signal, and calculate a difference between the readout offset signal and pixel signal.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described below with reference to the accompanying drawings. The following embodiments can be appropriately changed and combined. The following embodiments are directed to a radiation imaging apparatus such as a digital X-ray imaging apparatus, a driving method therefor, and a radiation imaging system.

First Embodiment

Figure 1:
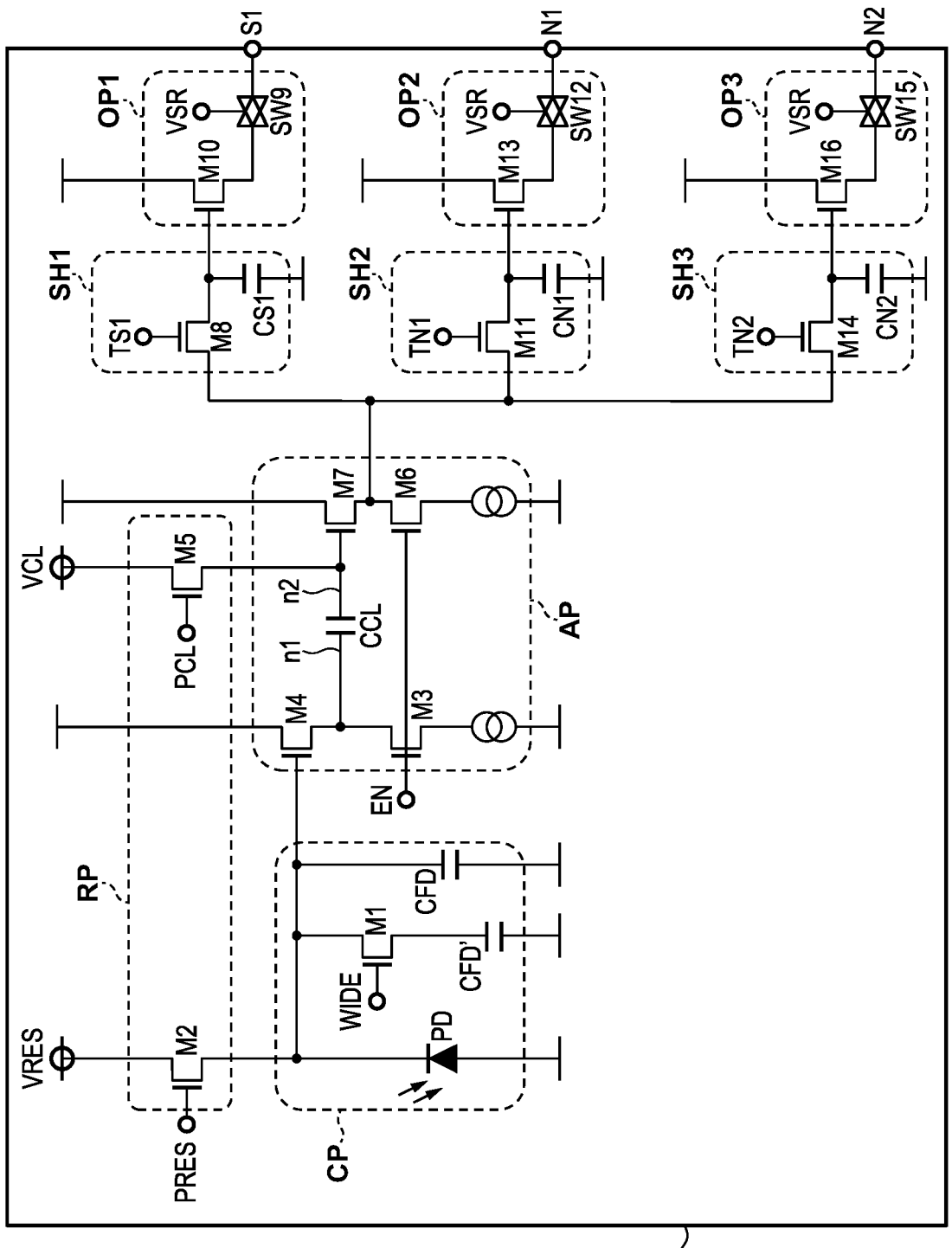
FIG. 1 is an equivalent circuit diagram for explaining the arrangement of a pixel according to an embodiment of the present invention.

FIG. 1 is an equivalent circuit diagram for explaining the schematic circuit of one pixel in a radiation imaging apparatus 100 (FIG. 3) according to an embodiment of the present invention. A pixel P can include a conversion unit CP, an amplification unit AP, a reset unit RP, holding units SH1 to SH3, and output units OP1 to OP3. In the following example, each of these components is formed from a circuit. For example, the conversion unit CP is formed from a conversion circuit.

The conversion unit CP can include a photodiode PD, a transistor M1, a floating diffusion capacitor CFD (to be referred to as a FD capacitor CFD hereinafter), and a sensitivity switching additional capacitor CFD'. The photodiode PD is an example of a photoelectric conversion element, and converts light generated in accordance with radiation entering a scintillator serving as a wavelength converter. That is, a conversion element that converts radiation into charges is formed from a wavelength converter that converts radiation into light, and a photoelectric conversion element that converts light into charges. Instead of this, an element that directly converts radiation into charges may be used as the conversion element. Charges of an amount corresponding to radiation are generated at the photodiode PD, and a voltage of the FD capacitor CFD that corresponds to the generated charge amount is output to the amplification unit AP. The sensitivity switching capacitor CFD' is used to switch the sensitivity of the pixel P with respect to radiation, and is connected to the photodiode PD via the transistor M1 (switching element). When a WIDE signal is activated, the transistor M1 is turned on and the voltage of the combined capacity of the FD capacitor CFD and the capacitor CFD' is output to the amplification unit AP. That is, the ON state of the transistor M1 can be controlled to output either the first sensitivity signal of a voltage corresponding to charges converted by the conversion unit CP of the first sensitivity or the second sensitivity signal of a voltage corresponding to charges converted by the conversion unit CP of the second sensitivity different from the first sensitivity.

The amplification unit AP includes a control transistor M3, an amplification transistor M4, a clamp capacitor CCL, a control transistor M6, an amplification transistor M7, and constant current sources. The control transistor M3, the amplification transistor M4, and the constant current source (for example, current mirror transistors) are series-connected to form a current path. When an enable signal EN input to the gate of the control transistor M3 is activated, the amplification transistor M4 that receives a voltage from the conversion unit CP operates. A source follower circuit is thus formed, and a voltage obtained by amplifying the voltage from the conversion unit CP is output from the amplification transistor M4. The voltage output from the amplification transistor M4 is input to the amplification transistor M7 via the clamp capacitor CCL. The control transistor M6, the amplification transistor M7, and the constant current source are series-connected to form a current path. When the enable signal EN input to the gate of the control transistor M6 is activated, the amplification transistor M7 that receives a voltage from the amplification transistor M4 operates. A source follower circuit is thus formed, and a voltage obtained by amplifying the voltage from the amplification transistor M4 is output from the amplification transistor M7. The clamp capacitor CCL is series-interposed between the amplification transistors M4 and M7. A clamp operation by the clamp capacitor CCL will be explained later together with the reset unit RP to be described below.

The reset unit RP includes reset transistors M2 and M5. When a reset signal PRES is activated, the reset transistor M2 supplies a predetermined potential to the photodiode PD to reset (initialize) the charges of the photodiode PD and reset a voltage to be output to the amplification unit AP. The reset transistor M5 supplies a predetermined potential to a connection node between the clamp capacitor CCL and the amplification transistor M7 to reset a voltage to be output from the amplification transistor M7. A voltage corresponding to a voltage from the conversion unit CP at the time of reset by the reset transistor M2 is input to an input terminal n1 of the clamp capacitor CCL. When a clamp signal PCL is activated, the reset transistor M5 is turned on and a clamp voltage VCL serving as a predetermined potential is input to an output terminal n2 of the clamp capacitor CCL. A potential difference generated across the clamp capacitor CCL is clamped as a noise component, and a voltage that has changed upon subsequent generation and accumulation of charges in the photodiode PD is output as a signal component. This is the clamp operation using the clamp capacitor CCL. The clamp operation suppresses a noise component such as kTC noise generated in the conversion unit CP by the clamp operation, or the offset of the amplification transistor M4. The conversion unit CP and the amplification unit AP constitute a signal generation unit that generates a signal based on charges generated and accumulated in accordance with radiation. This signal will be called a pixel signal. The pixel signal is based on the above-mentioned first sensitivity signal or second sensitivity signal. A signal generated by the signal generation unit when the reset unit RP resets the signal generation unit to a state before accumulation of charges will be called an offset signal. The signal generation unit is reset by resetting the potential of the photoelectric conversion element PD and the potential of the output terminal n2 of the clamp capacitor CCL, as described above.

The holding unit SH1 is a portion capable of holding a pixel signal output from the amplification unit AP, and is a sample and hold circuit including a transfer transistor M8 and a holding capacitor CS1. More specifically, the state (ON or OFF state) of the transfer transistor M8 is switched using a sample and hold control signal TS1, and sampling is performed to transfer the pixel signal to the capacitor CS1 and hold it. The output unit OP1 includes a signal amplification transistor M10 and an output switch SW9. The signal amplification transistor M10 is a transistor for amplifying and outputting the pixel signal held by the holding capacitor CS1. The output switch SW9 is a switch for transferring the pixel signal output from the signal amplification transistor M10. More specifically, when the output switch SW9 is turned on in accordance with a vertical scanning signal VSR input to the output switch SW9, a constant current source (not shown) on a subsequent stage and the signal amplification transistor M10 form a source follower circuit. The output unit OP1 amplifies the pixel signal held by the holding unit SH1 and outputs it from the pixel P. The amplified pixel signal output from the pixel P will be called a pixel signal S1.

The holding unit SH2 is a portion capable of holding an offset signal output from the amplification unit AP, and is a sample and hold circuit including a transfer transistor M11 and a holding capacitor CN1. More specifically, the state (ON or OFF state) of the transfer transistor M11 is switched using a sample and hold control signal TN1, and sampling is performed to transfer the offset signal to the capacitor CN1 and hold it. The output unit OP2 includes a signal amplification transistor M13 and an output switch SW12. The signal amplification transistor M13 is a transistor for amplifying and outputting the offset signal held by the holding capacitor CN1. The output switch SW12 is a switch for transferring the offset signal output from the signal amplification transistor M13. More specifically, when the output switch SW12 is turned on in accordance with the vertical scanning signal VSR input to the output switch SW12, a constant current source (not shown) on a subsequent stage and the signal amplification transistor M13 form a source follower circuit. The output unit OP2 amplifies the offset signal held by the holding unit SH2 and outputs it from the pixel P. The amplified offset signal output from the pixel P will be called an offset signal N1.

The holding unit SH3 is a portion capable of holding an offset signal output from the amplification unit AP, and is a sample and hold circuit including a transfer transistor M14 and a holding capacitor CN2. More specifically, the state (ON or OFF state) of the transfer transistor M14 is switched using a sample and hold control signal TN2, and sampling is performed to transfer the offset signal to the capacitor CN2 and hold it. The output unit OP3 includes a signal amplification transistor M16 and an output switch SW15. The signal amplification transistor M16 is a transistor for amplifying and outputting the offset signal held by the holding capacitor CN2. The output switch SW15 is a switch for transferring the offset signal output from the signal amplification transistor M16. More specifically, when the output switch SW15 is turned on in accordance with the vertical scanning signal VSR input to the output switch SW15, a constant current source (not shown) on a subsequent stage and the signal amplification transistor M16 form a source follower circuit. The output unit OP3 amplifies the offset signal held by the holding unit SH3 and outputs it from the pixel P. The amplified offset signal output from the pixel P will be called an offset signal N2.

After sampling and holding by the holding capacitors CS1, CN1, and CN2, the transfer transistors M8, M11, and M14 are turned off and the capacitors CS1, CN1, and CN2 are disconnected from the amplification unit AP on a preceding stage. The held pixel signal and offset signals can be read out nondestructively until sampling and holding is performed again.

Figure 2A:
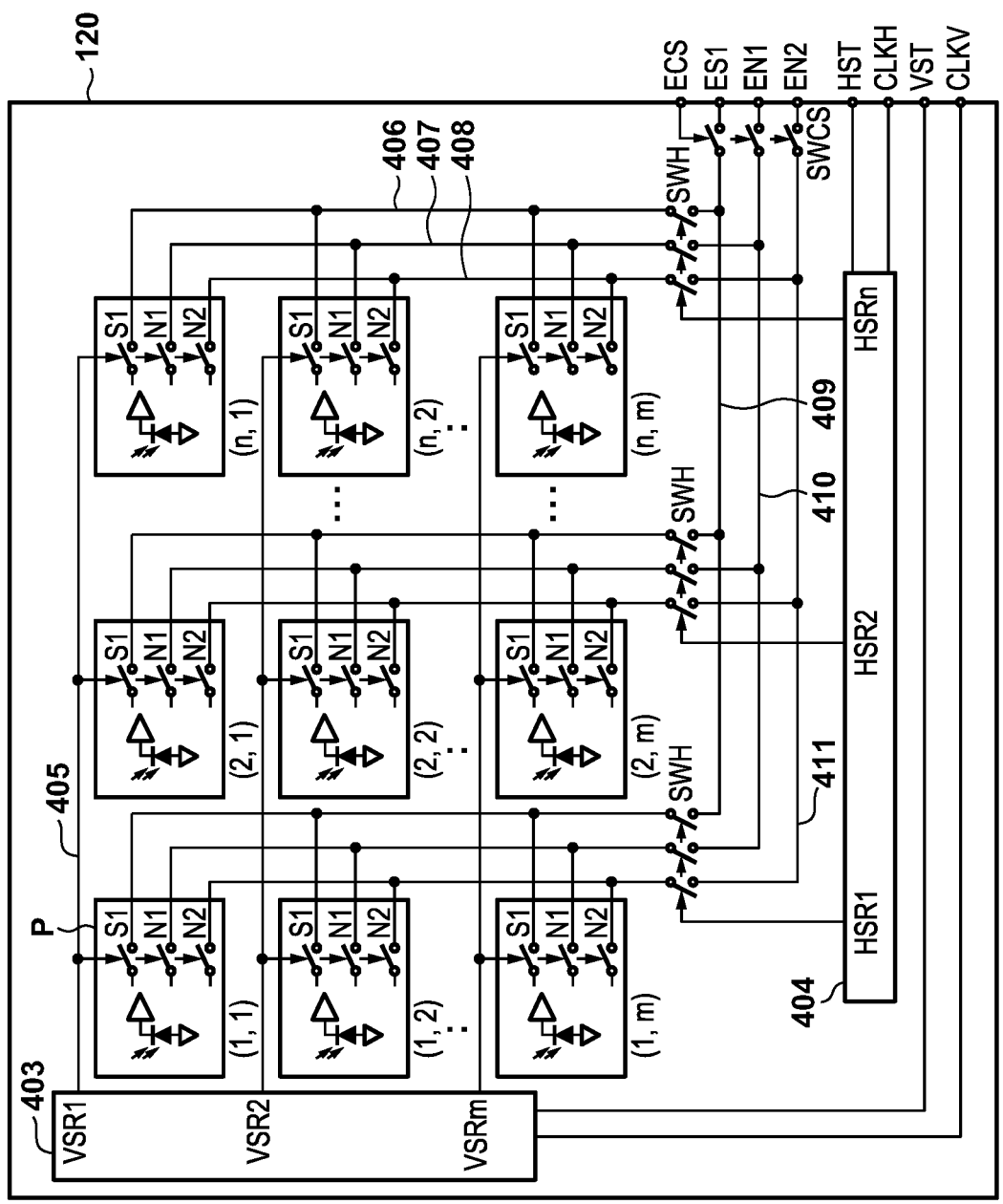
FIG. 2A is an equivalent circuit diagram for explaining the arrangement of a pixel array and signal readout unit according to the embodiment of the present invention.
Figure 2B:
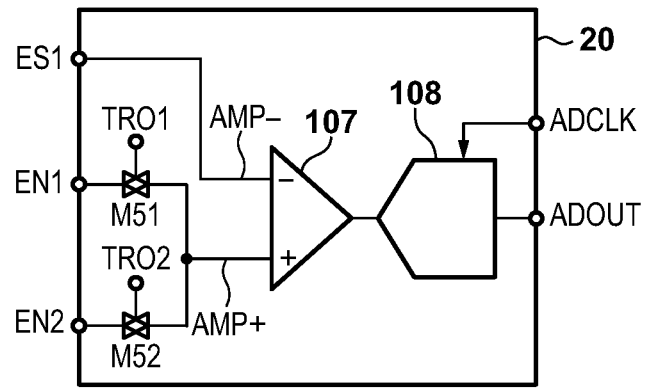
FIG. 2B is an equivalent circuit diagram for explaining the arrangement of the pixel array and signal readout unit according to the embodiment of the present invention.

Next, a pixel array 120 and a signal readout unit 20 in the radiation imaging apparatus 100 according to the embodiment will be described with reference to FIGS. 2A and 2B. The pixel array 120 is constituted by two-dimensionally arraying a plurality of pixels P in FIG. 1. The signal readout unit 20 reads out a signal from the pixel array 120. First, the pixel array 120 of the radiation imaging apparatus 100 according to the embodiment will be described with reference to FIG. 2A. FIG. 2A is an equivalent circuit diagram for explaining the schematic arrangement of the pixel array 120 of the radiation imaging apparatus 100 according to the embodiment.

Figure 3:
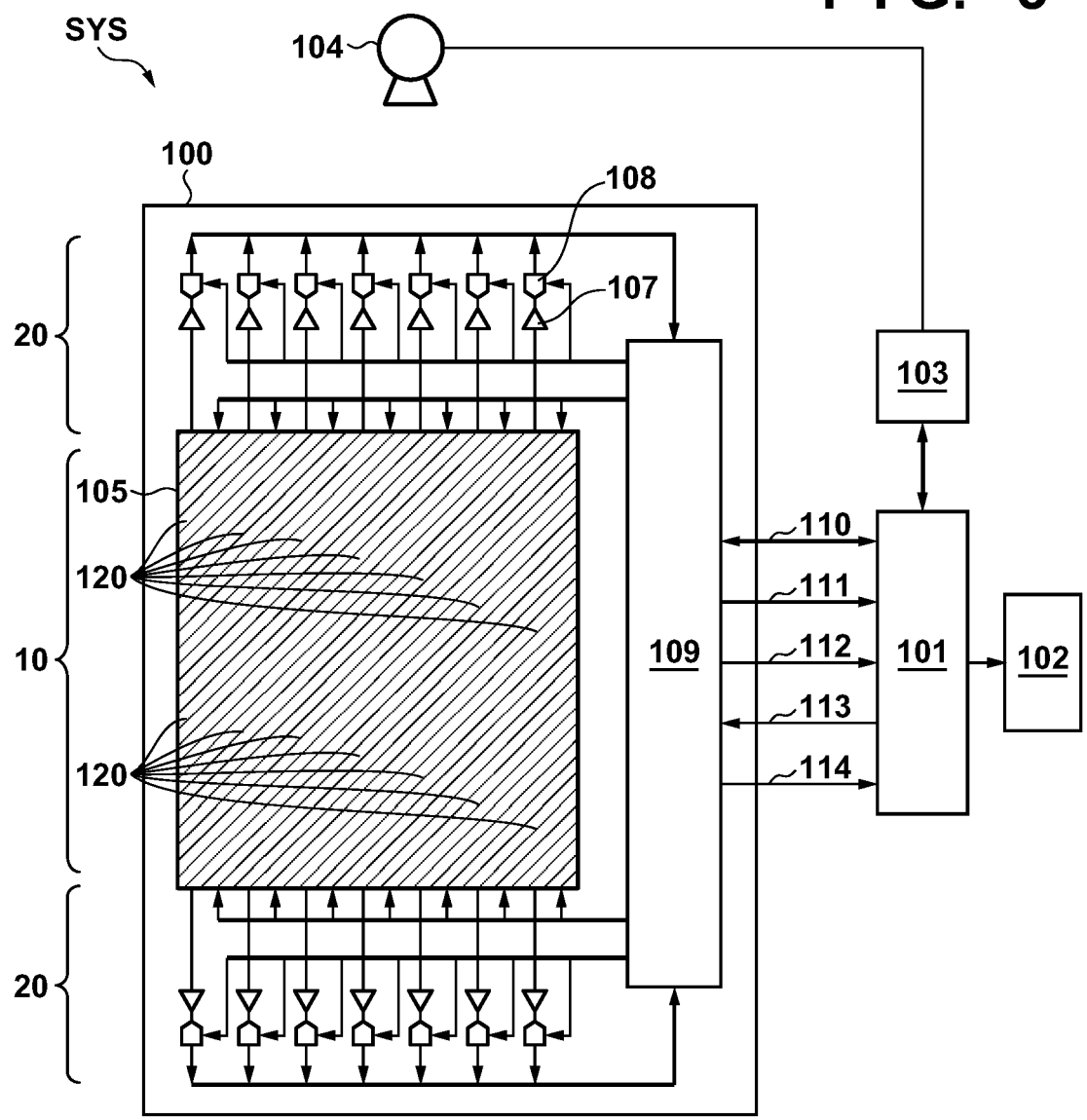
FIG. 3 is a schematic view for explaining the arrangement of a radiation imaging system according to the embodiment of the present invention.

The pixel array 120 includes a plurality of pixels P, a vertical scanning circuit 403 for driving the pixels P, and a horizontal scanning circuit 404 for reading out signals from the pixels P. The vertical scanning circuit 403 and the horizontal scanning circuit 404 are constituted by, for example, shift registers and operate based on control signals from a control unit 109 (FIG. 3). The vertical scanning circuit 403 supplies a vertical scanning signal VSR to the pixels P via control lines 405, and drives the pixels P for each row based on the vertical scanning signal VSR. That is, the vertical scanning circuit 403 functions as a row selection unit and selects a row of the pixels P subjected to signal readout. The horizontal scanning circuit 404 functions as a column selection unit and selects a column of the pixels P based on a horizontal scanning signal HSR to sequentially output signals from the pixels P (horizontal transfer). The operation frequency of the row selection unit (vertical scanning circuit 403) is higher than that of the column selection unit (horizontal scanning circuit 404). That is, the row selection unit (vertical scanning circuit 403) operates slower than the column selection unit (horizontal scanning circuit 404).

The pixel array 120 also includes a terminal ES1 for reading out a pixel signal held by the capacitor CS1 of each pixel P, a terminal EN1 for reading out an offset signal held by the capacitor CN1, and a terminal EN2 for reading out an offset signal held by the capacitor CN2. The pixel array 120 further includes a select terminal ECS. When a signal received by the terminal ECS is activated, the signals of each pixel P of the pixel array 120 can be read out via the terminals ES1, EN1, and EN2. More specifically, the above-described pixel signal S1, offset signal N1, and offset signal N2 of each pixel P are supplied to column signal lines 406 to 408 corresponding to the respective terminals. The column signal lines 406 to 408 are connected to analog output lines 409 to 411 via switches SWH that are turned on in response to a control signal from the horizontal scanning circuit 404. Signals on the analog output lines 409 to 411 are output from the terminals ES1, EN1, and EN2 via switches SWCS that are turned on in response to a signal received by the terminal ECS.

The pixel array 120 further includes terminals HST, CLKH, VST, and CLKV that receive control signals for controlling the vertical scanning circuit 403 and the horizontal scanning circuit 404. The terminal HST receives a start pulse input to the horizontal scanning circuit 404. The terminal CLKH receives a clock signal input to the horizontal scanning circuit 404. The terminal VST receives a start pulse input to the vertical scanning circuit 403. The terminal CLKV receives a clock signal input to the vertical scanning circuit 403. These control signals are input from the control unit 109 to be described later. The horizontal scanning circuit 404 generates the horizontal scanning signal HSR based on the input start pulse and clock signal and outputs it. The vertical scanning circuit 403 generates the vertical scanning signal VSR based on the input start pulse and clock signal and outputs it. Accordingly, the pixel signal S1, the offset signal N1, and the offset signal N2 are sequentially read out from each pixel P by the X-Y addressing method. That is, the pixels P are controlled for each row in the pixel array 120 and signals are read out by outputting (horizontally transferring) signals held by the holding units for each column.

Next, the signal readout unit 20 of the radiation imaging apparatus according to the embodiment will be described with reference to FIG. 2B. FIG. 2B is an equivalent circuit diagram for explaining the schematic arrangement of the signal readout unit 20 of the radiation imaging apparatus according to the embodiment. The signal readout unit 20 can include a signal amplification unit 107 including a differential amplifier or the like, and an A/D conversion unit 108 that performs A/D conversion.

The pixel signal S1 from the terminal ES1 is input to an inverting input terminal AMP− of the signal amplification unit 107. The offset signal N1 from the terminal EN1 is input to a non-inverting input terminal AMP+ of the signal amplification unit 107 via a switch M51 that is turned on in response to a control signal TRO1 input to a control terminal. The offset signal N2 from the terminal EN2 is input to the non-inverting input terminal AMP+ via a switch M52 that is turned on in response to a control signal TRO2 input to a control terminal. The switches M51 and M52 are controlled to input a signal of either the terminal EN1 or the terminal EN2 to the non-inverting input terminal AMP+. The switches M51 and M52 and the signal amplification unit 107 are designed to have a response characteristic that can follow the cycle of a signal ADCLK.

The signal amplification unit 107 amplifies a difference between a signal from the terminal ES1 and a signal from the terminal EN1, or a difference between a signal from the terminal ES1 and a signal from the terminal EN2. The A/D conversion unit 108 A/D-converts this difference based on a clock signal input via the terminal ADCLK. With this arrangement, image data (digital data) of the pixel array 120 is obtained and output via a terminal ADOUT to the control unit 109 to be described later.

The radiation imaging apparatus 100 and a radiation imaging system SYS according to the embodiment are constituted using the above-described pixel array 120 and signal readout unit 20. Next, the radiation imaging apparatus 100 and the radiation imaging system SYS according to the embodiment will be described with reference to FIG. 3. FIG. 3 is a schematic view for explaining the schematic arrangements of the radiation imaging apparatus 100 and radiation imaging system SYS according to the embodiment.

The radiation imaging system SYS includes the radiation imaging apparatus 100, a radiation generation apparatus 104 that generates radiation, an exposure control unit 103, a signal processing unit 101 that performs image processing and system control, and a display unit 102 including a display or the like. When performing radiation imaging, the signal processing unit 101 can perform synchronized control of the radiation imaging apparatus 100 and the exposure control unit 103. The radiation imaging apparatus 100 generates a signal based on radiation (X-rays, α-rays, β-rays, γ-rays, or the like) having passed through a subject. This signal undergoes predetermined processing in the signal processing unit 101 and the like, and then image data is generated based on the radiation. This image data is displayed as a radiation image on the display unit 102. The radiation imaging apparatus 100 includes an imaging panel 105 having an imaging region 10, the signal readout units 20 that read out a signal from the imaging region 10, and the control unit 109 that controls the respective units.

The imaging panel 105 is constituted by tiling (two-dimensionally arraying) a plurality of pixel arrays 120 on a plate-like base. The large-size imaging panel 105 can be formed from this arrangement. A plurality of pixels P are arrayed on each pixel array 120. The imaging region 10 includes a plurality of pixels P arrayed to form rows and columns of the pixel arrays 120. Although the pixel arrays 120 are tiled to form 7 columns×2 rows in this exemplary arrangement, the arrangement is not limited to this.

The control unit 109 communicates control commands and sync signals with, for example, the signal processing unit 101 and outputs image data to the signal processing unit 101. The control unit 109 controls the imaging region 10 or each unit and performs, for example, setting of the reference voltage of each pixel array 120, driving control of each pixel, and operation mode control. The control unit 109 generates one frame data using image data (digital data) of the pixel arrays 120 that are A/D-converted by the A/D conversion units 108 of the signal readout units 20, and outputs the frame data to the signal processing unit 101. The control unit 109 may be formed from a processor such as a CPU and a memory such as a RAM or a ROM. The processor of the control unit 109 may execute a program stored in the memory to execute the operation of the radiation imaging apparatus 100 to be described later. Instead of this, the control unit 109 may be formed from a dedicated circuit such as ASIC (Application Specific Integrated Circuit).

The control unit 109 and the signal processing unit 101 exchange control commands or control signals and image data with each other via various interfaces. The signal processing unit 101 outputs setting information or imaging information such as an operation mode or various parameters to the control unit 109 via a control interface 110. The control unit 109 outputs apparatus information such as the operation state of the radiation imaging apparatus 100 to the signal processing unit 101 via the control interface 110. The control unit 109 outputs image data obtained by the radiation imaging apparatus 100 to the signal processing unit 101 via an image data interface 111. The control unit 109 uses a READY signal 112 to notify the signal processing unit 101 that the radiation imaging apparatus 100 has changed to an imaging ready state. The signal processing unit 101 uses an external sync signal 113 to notify the control unit 109 of the timing of the irradiation start (exposure) of radiation in response to the READY signal 112 from the control unit 109. The control unit 109 outputs a control signal to the exposure control unit 103 to start irradiation with radiation while an exposure permission signal 114 is enabled.

Figure 4:
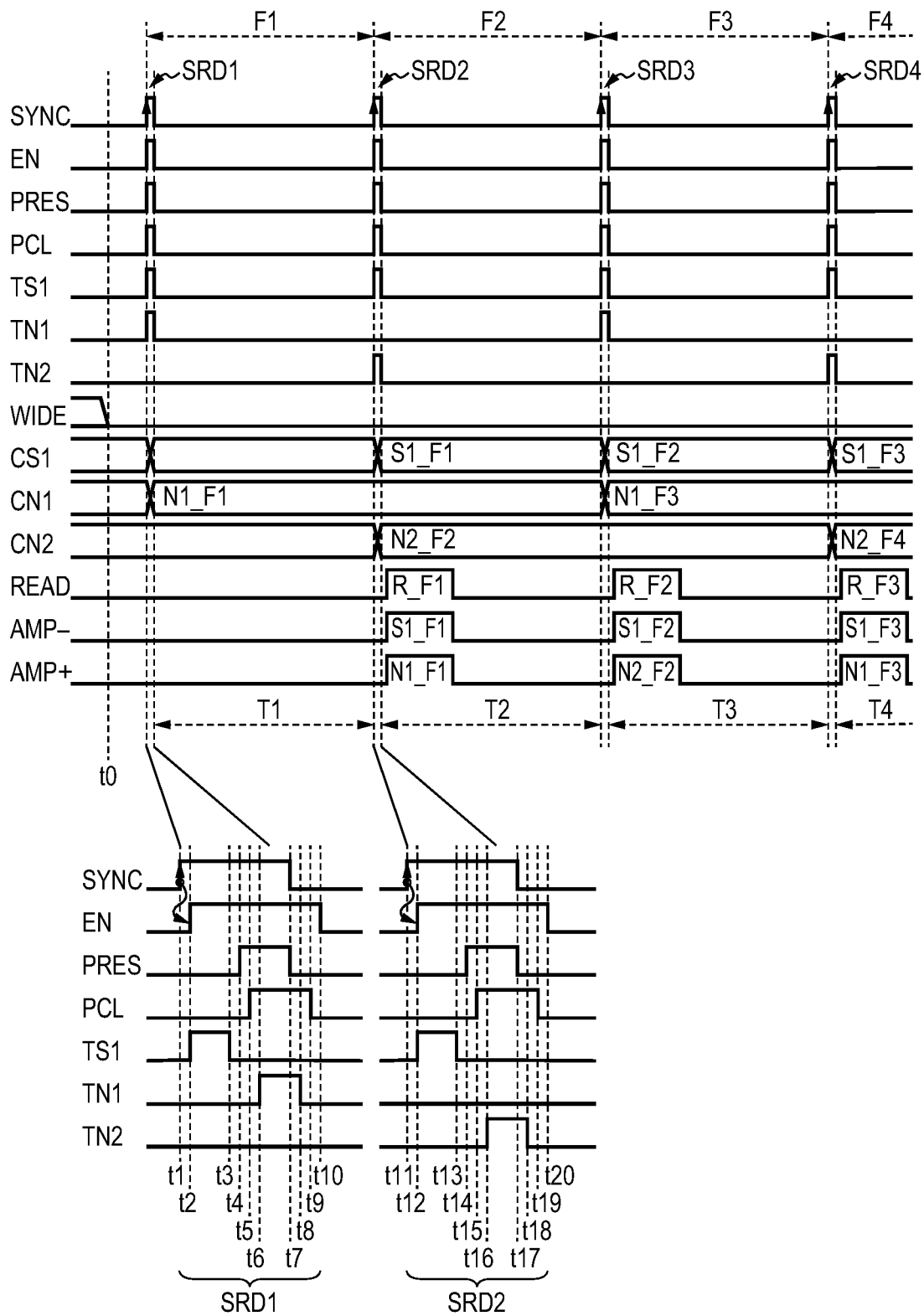
FIG. 4 is a timing chart for explaining a method of driving a radiation imaging apparatus according to the first embodiment of the present invention.

FIG. 4 is a timing chart showing an example of a method of driving the radiation imaging apparatus 100. This method is executed by controlling the operation of each component of the radiation imaging apparatus 100 by the control unit 109. The radiation imaging apparatus 100 performs capturing of a moving image formed from a plurality of frame images, for example, performs high-speed moving image capturing at 60 fps or more. The driving method in FIG. 4 will be explained in a case in which the frame rate is constant, the accumulation period is maximum within the frame period, and an imaging mode in which no additional capacitor CFD' is added is set.

Frame periods F1 to F4 are the first to fourth frame periods after the start of imaging. The frame period is a period repeated to generate a plurality of frame images. Accumulation periods T1 to T4 are accumulation periods corresponding to the frame periods F1 to F4. The accumulation period is a period during which charges generated in accordance with radiation are accumulated in the photoelectric conversion element PD. In FIG. 4, "SYNC" to "WIDE" represent the levels of respective signals. "CS1", "CN1", and "CN2" represent signals held in the capacitive elements CS1, CN1, and CN2. "READ" represents a period during which a signal is read out from the pixel array 120 to the signal readout unit 20. The control unit 109 executes the signal readout operation while "READ" is at high level. "AMP−" represents a period during which a signal is input to the inverting input terminal AMP− of the signal amplification unit 107. "AMP+" represents a period during which a signal is input to the non-inverting input terminal AMP+ of the signal amplification unit 107. "READ" represents a period during which a signal is output from the output terminal of the signal amplification unit 107. Each period represents an input period during which a signal is at high level.

At time t0, an imaging mode is set. More specifically, the sensitivity of the pixel P is the first sensitivity of only the FD capacitor CFD without adding the sensitivity switching additional capacitor CFD', and the control unit 109 inactivates the control signal WIDE. When the control unit 109 detects the rise of a pulse of the SYNC signal at time t1, it starts driving from time t2 to generate a frame image. The SYNC signal can be either an external sync signal or an internal sync signal, but is the external sync signal SYNC in the embodiment. One frame period starts from the rise of a pulse of the SYNC signal. At the next rise, this frame period ends and the next frame period starts. For example, the frame period F1 starts at time t1, and at time t11, the frame period F1 ends and the next frame period F2 starts. SRD1 to SRD4 represent sample and hold reset drivings executed in the frame periods F1 to F4. Sample and hold reset driving is driving of performing sampling and holding of a pixel signal, reset of the conversion unit CP and amplification unit AP, and sampling and holding of an offset signal.

The sample and hold reset driving SRD1 in the frame period F1 will be explained. The control unit 109 performs the following sample and hold reset driving SRD1 at once on all the pixels P included in the imaging panel 105. That is, the control unit 109 controls the pixels P so that the respective pixels generate pixel signals and offset signals at the same timing.

At time t2, the control unit 109 activates the enable signal EN. In response to this, the control transistors M3 and M6 are turned on. When the control transistor M3 becomes ON, the amplification transistor M4 that receives a voltage from the conversion unit CP operates and outputs a voltage obtained by amplifying the voltage from the conversion unit CP. When the control transistor M6 becomes ON, the amplification transistor M7 that receives a voltage from the amplification transistor M4 operates and outputs a voltage obtained by amplifying the voltage from the amplification transistor M4.

The control unit 109 activates the control signal TS1 during a period between time t2 and time t3. The transfer transistor M8 is switched from the OFF state to the ON state, and a pixel signal is transferred to and held in the holding capacitor CS1 (that is, sampling of the pixel signal is performed). In the first sample and hold reset driving SRD1 after the start of imaging, charges generated in accordance with radiation are not accumulated, so the pixel signal sampled and held in the holding capacitor CS1 is not used for generation of a frame image.

At time t4, the control unit 109 activates the reset signal PRES. In response to this, a reset voltage VRES, which is a predetermined potential, is supplied to the photodiode PD and the charges of the photodiode PD are reset. As a result, a voltage to be output to the amplification unit AP is reset, and a voltage corresponding to a voltage from the conversion unit CP at the time of reset by the reset transistor M2 is input to the input terminal n1 of the clamp capacitor CCL. At time t5, the control unit 109 activates the clamp signal PCL. The predetermined voltage VCL is supplied to a connection node between the clamp capacitor CCL and the amplification transistor M7. As a result, a voltage to be output from the amplification transistor M7 is reset and the clamp voltage VCL, which is a predetermined potential, is input to the output terminal n2 of the clamp capacitor CCL.

The control unit 109 activates the control signal TN1 during a period between time t6 and time t8. The transfer transistor M11 is switched from the OFF state to the ON state, and an offset signal is transferred to and held in the holding capacitor CN1 (that is, sampling of the offset signal is performed). An offset signal generated in the frame period F1 will be referred to as an offset signal N1_F1. The offset signal N1_F1 is held until it is overwritten by the driving SRD3 in the frame period F3. In the sample and hold reset driving SRD1, the control unit 109 does not activate the sample and hold control signal TN2.

At time t7, the control unit 109 inactivates the reset signal PRES. The reset transistor M2 is thus turned off. At time t9, the control unit 109 inactivates the clamp signal PCL. The reset transistor M5 is turned off, and a potential difference generated between the input terminal n1 and the output terminal n2 is held across the clamp capacitor CCL. At time t10, the control unit 109 inactivates the enable signal EN input to the gates of the control transistors M3 and M6. The amplification transistors M4 and M7 stop operating, and the accumulation period T1 starts in which charges converted in accordance with radiation are accumulated in the photoelectric conversion element PD.

The sample and hold reset driving SRD2 in the frame period F2 will be explained next. When the control unit 109 detects the rise of a pulse of the SYNC signal at time t11, it starts driving from time t12 to generate a frame image. The control unit 109 performs the following sample and hold reset driving SRD2 at once on all the pixels P included in the imaging panel 105. That is, the control unit 109 supplies control signals to the pixels P at the same timing.

At time t12, the control unit 109 activates the enable signal EN. Similar to the frame period F1, the amplification transistor M4 outputs a voltage obtained by amplifying a voltage from the conversion unit CP, and the amplification transistor M7 outputs a voltage obtained by amplifying the voltage from the amplification transistor M4.

The control unit 109 activates the control signal TS1 during a period between time t12 and time t13. The transfer transistor M8 is switched from the OFF state to the ON state, and a pixel signal corresponding to charges accumulated in the photoelectric conversion element PD during the accumulation period T1 is transferred to and held in the holding capacitor CS1 (that is, sampling of the pixel signal is performed). A pixel signal, accumulation of which starts in the frame period F1, will be referred to as a pixel signal S1_F1. The pixel signal S1_F1 is the pixel signal S1 generated in accordance with charges accumulated subsequently to generation of the offset signal N1_F1.

At time t14, the control unit 109 then activates the reset signal PRES. Similar to the frame period F1, a voltage corresponding to a voltage from the conversion unit CP at the time of reset by the reset transistor M2 is input to the input terminal n1 of the clamp capacitor CCL. At time t15, the control unit 109 activates the clamp signal PCL. Similar to the frame period F1, the clamp voltage VCL, which is a predetermined potential, is input to the terminal n2 of the clamp capacitor CCL.

The control unit 109 activates the control signal TN2 during a period between time t16 and time t18. The transfer transistor M14 is switched from the OFF state to the ON state, and an offset signal is transferred to and held in the holding capacitor CN2 (that is, sampling of the offset signal is performed). An offset signal in the frame period F2 will be referred to as an offset signal N2_F2. The offset signal N2_F2 is held until it is overwritten by the driving SRD4 in the frame period F4. In the sample and hold reset driving SRD2, the control unit 109 does not activate the sample and hold control signal TN1. The offset signal N1_F1 is held in the holding unit SH2 and at the same time, the offset signal N2_F2 is held in the holding unit SH3.

At time t17, the control unit 109 inactivates the reset signal PRES. Then, the reset transistor M2 is turned off. At time t19, the control unit 109 inactivates the clamp signal PCL. The reset transistor M5 is turned off, and a potential difference generated between the input terminal n1 and the output terminal n2 is held across the clamp capacitor CCL. At time t20, the control unit 109 inactivates the enable signal EN input to the gates of the control transistors M3 and M6. The amplification transistors M4 and M7 stop operating, and the accumulation period T2 starts in which charges converted in accordance with radiation are accumulated in the photoelectric conversion element PD.

The subsequent sample and hold reset drivings SRD3 and SRD4 are executed similarly to the sample and hold reset drivings SRD1 to SRD2. The control unit 109 alternately activates the sample and hold control signals TN1 and TN2 in a series of sample and hold reset drivings. In the sample and hold reset driving SRD3, a pixel signal S1_F2 is held in the holding capacitor CS1 and an offset signal N1_F3 is held in the holding capacitor CN1. In the sample and hold reset driving SRD4, a pixel signal S1_F3 is held in the holding capacitor CS1 and an offset signal N2_F4 is held in the holding capacitor CN2. In this manner, the control unit 109 controls the pixels P to hold offset signals alternately in two sample and hold circuits in every frame period.

An operation of reading out a pixel signal and an offset signal from the pixel P will be described with reference to FIG. 4 continuously. In the embodiment, the signal readout unit 20 starts reading out the pixel signal S1 a predetermined time after the start of holding the pixel signal S1. At time t13 after the end of the frame period F1, the pixel signal S1_F1 is held in the holding capacitor CS1, and the offset signal N1_F1 is held in the holding capacitor CN1. The control unit 109 starts reading out the pixel signal S1_F1 and the offset signal N1_F1 held in these holding capacitors a predetermined time after time t20 (for example, after generation of the offset signal N2_F2). More specifically, the control unit 109 activates the select terminal ECS and the control signal TRO1 and inactivates the control signal TRO2. Then, the control unit 109 controls the vertical scanning circuit 403 and the horizontal scanning circuit 404 to select one of the pixels P included in the pixel array 120. The pixel signal S1_F1 held by the selected pixel P is input to the inverting input terminal AMP− of the signal amplification unit 107, and the offset signal N1_F1 held by the selected pixel P is input to the non-inverting input terminal AMP+ of the signal amplification unit 107. In this fashion, the signal readout unit 20 reads out the pixel signal S1_F1 and the offset signal N1_F1 at the same timing.

After receiving these inputs, the signal amplification unit 107 outputs a signal obtained by calculating a difference between the pixel signal S1_F1 and the offset signal N1_F1. This output signal is equivalent to a pixel signal for which an offset signal is corrected. The output signal is converted into digital data by the A/D conversion unit 108 and supplied to the control unit 109. The control unit 109 sequentially switches selected pixels by controlling the vertical scanning circuit 403 and the horizontal scanning circuit 404, obtains digital data for generating one frame image, and generates a frame image corresponding to the frame period F1.

Subsequently, after the end of the frame period F2, the pixel signal S1_F2 is held in the holding capacitor CS1 and the offset signal N2_F2 is held in the holding capacitor CN2 after the end of the sample and hold reset driving SRD3. The control unit 109 starts reading out the pixel signal S1_F2 and the offset signal N2_F2 held in these holding capacitors a predetermined time after the end of the sample and hold reset driving SRD3. More specifically, the control unit 109 activates the select terminal ECS and the control signal TRO2 and inactivates the control signal TRO1. The control unit 109 sequentially selects the pixels P included in the pixel array 120 in the above-described way. The control unit 109 generates a frame image corresponding to the frame period F2.

In the above-described embodiment, a frame image is generated from a difference between an offset signal and a pixel signal generated in accordance with charges accumulated subsequently to the generation of the offset signal. This difference cancels ripple components in the voltages VRES and VCL supplied from the reset unit RP to the conversion unit CP and the amplification unit AP. A flicker in the frame image is therefore reduced.

Second Embodiment

Figure 5:
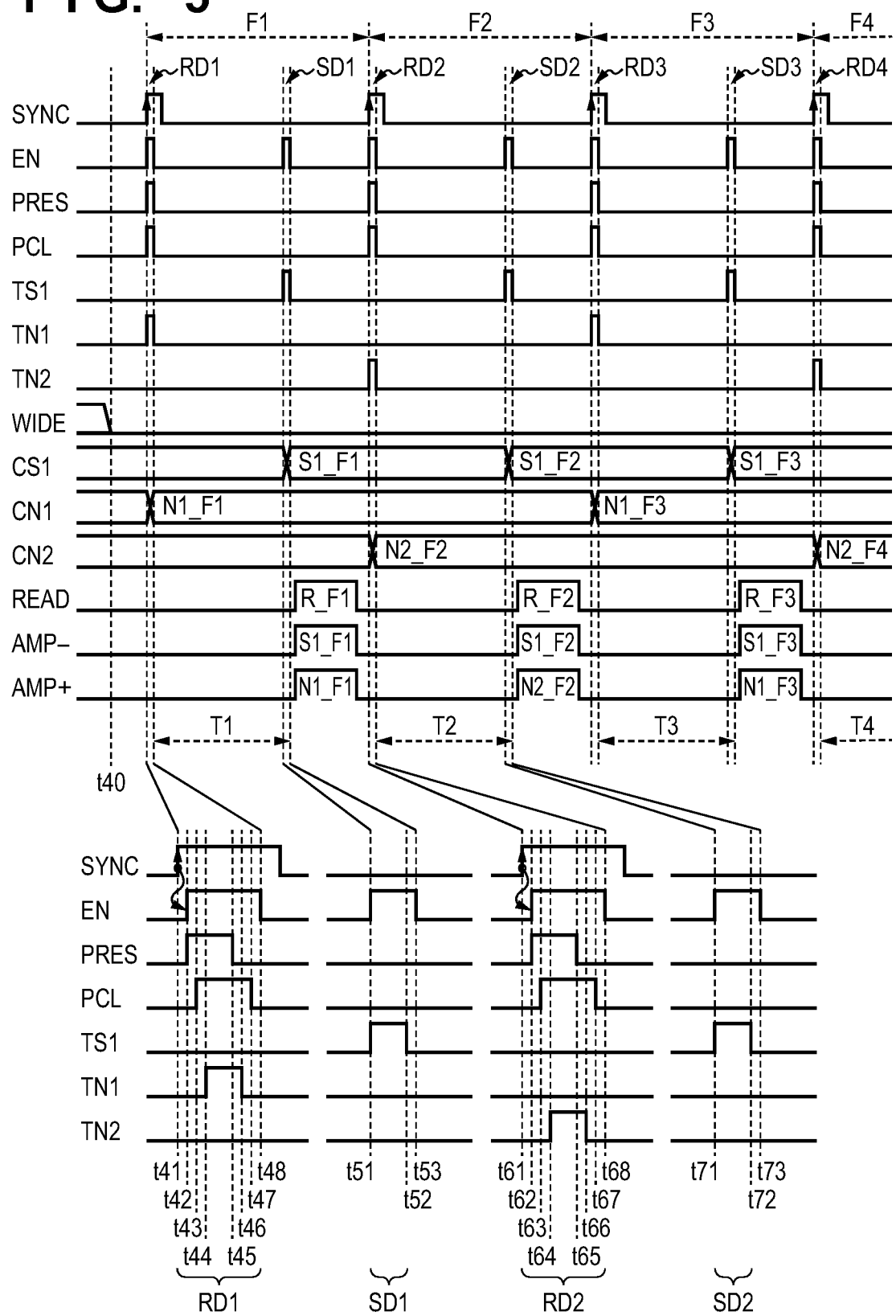
FIG. 5 is a timing chart for explaining a method of driving a radiation imaging apparatus according to the second embodiment of the present invention.

A method of driving a radiation imaging apparatus 100 according to the second embodiment will be described with reference to FIG. 5. The hardware arrangement of the radiation imaging apparatus 100 can be the same as that in the first embodiment and a repetitive description thereof will be omitted. A difference between the first and second embodiments will be mainly explained. The driving method in FIG. 5 will be explained in a case in which an imaging mode in which the accumulation period is shorter than a maximum one within the frame period is set.

An imaging mode is set at time t40. This processing is the same as the processing at time t0 in the first embodiment. When a control unit 109 detects the rise of a pulse of a SYNC signal at time t41, it starts driving from time t42 to generate a frame image. RD1 to RD4 represent reset drivings executed in frame periods F1 to F4. SD1 to SD4 represent sample and hold drivings executed in the frame periods F1 to F4. Reset driving is driving of performing reset of a conversion unit CP and amplification unit AP and sampling and holding of an offset signal. Sample and hold driving is driving of performing sampling and holding of a pixel signal.

The reset driving RD1 in the frame period F1 will be explained. The control unit 109 performs the following reset driving RD1 at once on all pixels P included in an imaging panel 105. That is, the control unit 109 controls the pixels P so that the respective pixels generate offset signals at the same timing.

At time t42, the control unit 109 activates an enable signal EN. In response to this, control transistors M3 and M6 are turned on. When the control transistor M3 becomes ON, an amplification transistor M4 that receives a voltage from the conversion unit CP operates and outputs a voltage obtained by amplifying the voltage from the conversion unit CP. When the control transistor M6 becomes ON, an amplification transistor M7 that receives a voltage from the amplification transistor M4 operates and outputs a voltage obtained by amplifying the voltage from the amplification transistor M4.

At time t42, the control unit 109 activates a reset signal PRES. In response to this, a reset voltage VRES, which is a predetermined potential, is supplied to a photodiode PD and the charges of the photodiode PD are reset. As a result, a voltage to be output to the amplification unit AP is reset, and a voltage corresponding to a voltage from the conversion unit CP at the time of reset by a reset transistor M2 is input to an input terminal n1 of a clamp capacitor CCL. At time t43, the control unit 109 activates a clamp signal PCL. A predetermined voltage VCL is supplied to a connection node between the clamp capacitor CCL and the amplification transistor M7. A voltage to be output from the amplification transistor M7 is reset and the clamp voltage VCL, which is a predetermined potential, is input to an output terminal n2 of the clamp capacitor CCL.

The control unit 109 activates a control signal TN1 during a period between time t44 and time t46. A transfer transistor M11 is switched from the OFF state to the ON state, and an offset signal is transferred to and held in a holding capacitor CN1 (that is, sampling of the offset signal is performed). An offset signal generated in the frame period F1 will be referred to as an offset signal N1_F1. The offset signal N1_F1 is held until it is overwritten by the driving RD3 in the frame period F3. In the reset driving RD1, the control unit 109 does not activate a sample and hold control signal TN2.

At time t45, the control unit 109 inactivates the reset signal PRES. The reset transistor M2 is thus turned off. At time t47, the control unit 109 inactivates the clamp signal PCL. A reset transistor M5 is turned off, and a potential difference generated between the input terminal n1 and the output terminal n2 is held across the clamp capacitor CCL. At time t48, the control unit 109 inactivates the enable signal EN input to the gates of the control transistors M3 and M6. The amplification transistors M4 and M7 stop operating, and an accumulation period T1 starts in which charges converted in accordance with radiation are accumulated in the photoelectric conversion element PD.

The reset driving RD2 in the frame period F2 will be explained below. When the control unit 109 detects the rise of a pulse of the SYNC signal at time t61, it starts driving from time t62 to generate a frame image. The control unit 109 performs the following reset driving RD2 at once on all the pixels P included in the imaging panel 105. That is, the control unit 109 supplies control signals to the pixels P at the same timing.

At time t62, the control unit 109 activates the enable signal EN. Similar to the frame period F1, the amplification transistor M4 outputs a voltage obtained by amplifying a voltage from the conversion unit CP, and the amplification transistor M7 outputs a voltage obtained by amplifying the voltage from the amplification transistor M4.

At time t62, the control unit 109 activates the reset signal PRES. Similar to the frame period F1, a voltage corresponding to a voltage from the conversion unit CP at the time of reset by the reset transistor M2 is input to the input terminal n1 of the clamp capacitor CCL. At time t63, the control unit 109 activates the clamp signal PCL. Similar to the frame period F1, the clamp voltage VCL, which is a predetermined potential, is input to the terminal n2 of the clamp capacitor CCL.

The control unit 109 activates the control signal TN2 during a period between time t64 and time t66. A transfer transistor M14 is switched from the OFF state to the ON state, and an offset signal is transferred to and held in a holding capacitor CN2 (that is, sampling of the offset signal is performed). An offset signal in the frame period F2 will be referred to as an offset signal N2_F2. The offset signal N2_F2 is held until it is overwritten by the driving RD4 in the frame period F4. In the reset driving RD2, the control unit 109 does not activate the sample and hold control signal TN1. The offset signal N1_F1 is held in a holding unit SH2 and at the same time, the offset signal N2_F2 is held in a holding unit SH3.

At time t65, the control unit 109 inactivates the reset signal PRES. Then, the reset transistor M2 is turned off. At time t67, the control unit 109 inactivates the clamp signal PCL. The reset transistor M5 is turned off, and a potential difference generated between the input terminal n1 and the output terminal n2 is held across the clamp capacitor CCL. At time t68, the control unit 109 inactivates the enable signal EN input to the gates of the control transistors M3 and M6. The amplification transistors M4 and M7 stop operating, and an accumulation period T2 starts in which charges converted in accordance with radiation are accumulated in the photoelectric conversion element PD.

The subsequent reset drivings RD3 and RD4 are executed similarly to the reset drivings RD1 to RD2. The control unit 109 alternately activates the sample and hold control signals TN1 and TN2 in a series of sample and hold reset drivings. In the reset driving RD3, an offset signal N1_F3 is held in the holding capacitor CN1. In the reset driving RD4, an offset signal N2_F4 is held in the holding capacitor CN2. In this way, the control unit 109 controls the pixels P to hold offset signals alternately in two sample and hold circuits in every frame period.

The sample and hold driving SD1 in the frame period F1 will be explained below. The control unit 109 performs the following sample and hold driving SD1 at once on all the pixels P included in the imaging panel 105. That is, the control unit 109 controls the pixels P so that the respective pixels generate pixel signals at the same timing.

At time t51, the control unit 109 activates the enable signal EN. In response to this, the control transistors M3 and M6 are turned on. When the control transistor M3 becomes ON, the amplification transistor M4 that receives a voltage from the conversion unit CP operates and the amplification transistor M4 outputs a voltage obtained by amplifying the voltage from the conversion unit CP. When the control transistor M6 becomes ON, the amplification transistor M7 that receives a voltage from the amplification transistor M4 operates and the amplification transistor M7 outputs a voltage obtained by amplifying the voltage from the amplification transistor M4.

The control unit 109 activates a control signal TS1 during a period between time t51 and time t52. The transfer transistor M8 is switched from the OFF state to the ON state, and a pixel signal is transferred to and held in a holding capacitor CS1 (that is, sampling of the pixel signal is performed). A pixel signal, accumulation of which starts in the frame period F1, will be referred to as a pixel signal S1_F1. The pixel signal S1_F1 is a pixel signal S1 generated in accordance with charges accumulated subsequently to generation of the offset signal N1_F1. At time t53, the control unit 109 inactivates the enable signal EN input to the gates of the control transistors M3 and M6. Then, the amplification transistors M4 and M7 stop operating.

The sample and hold driving SD2 in the frame period F2 will be explained below. The control unit 109 performs the following sample and hold driving SD2 at once on all the pixels P included in the imaging panel 105. That is, the control unit 109 supplies control signals control signals to the pixels P at the same timing.

At time t71, the control unit 109 activates the enable signal EN. Similar to the frame period F1, the amplification transistor M4 outputs a voltage obtained by amplifying a voltage from the conversion unit CP, and the amplification transistor M7 outputs a voltage obtained by amplifying the voltage from the amplification transistor M4.

The control unit 109 activates the control signal TS1 during a period between time t71 and time t72. The transfer transistor M8 is switched from the OFF state to the ON state, and a pixel signal corresponding to charges accumulated in the photoelectric conversion element PD during the accumulation period T2 is transferred to and held in the holding capacitor CS1 (that is, sampling of the pixel signal is performed). A pixel signal, accumulation of which starts in the frame period F2, will be referred to as a pixel signal S1_F2. The pixel signal S1_F2 is the pixel signal S1 generated in accordance with charges accumulated subsequently to generation of the offset signal N2_F2.

The subsequent sample and hold driving SD3 is also executed similarly to the sample and hold drivings SD1 and SD2. In the sample and hold driving SD3, a pixel signal S1_F3 is held in the holding capacitor CS1.

An operation of reading out a pixel signal and an offset signal from the pixel P will be described with reference to FIG. 5 continuously. The readout operation in the second embodiment is the same as that in the first embodiment. A signal readout unit 20 starts reading out the pixel signal S1 a predetermined time after the start of holding the pixel signal S1. At time t53 before the end of the frame period F1, the pixel signal S1_F1 is held in the holding capacitor CS1 and the offset signal N1_F1 is held in the holding capacitor CN1. The control unit 109 starts reading out the pixel signal S1_F1 and the offset signal N1_F1 held in these holding capacitors a predetermined time after time t53 (for example, before generation of the offset signal N2_F2). Then, the signal readout unit 20 generates a frame image by calculating a difference between the pixel signal S1_F1 and the offset signal N1_F1. In the second embodiment, a readout period R_F1 of the frame period F1 ends before the start of the frame period F2. The control unit 109 may control each pixel P to hold offset signals successively in one sample and hold circuit, instead of controlling each pixel P to hold offset signals alternately in two sample and hold circuits in every frame period. In this case, the holding unit SH3 and an output unit OP3 may be omitted.

Figure 6:
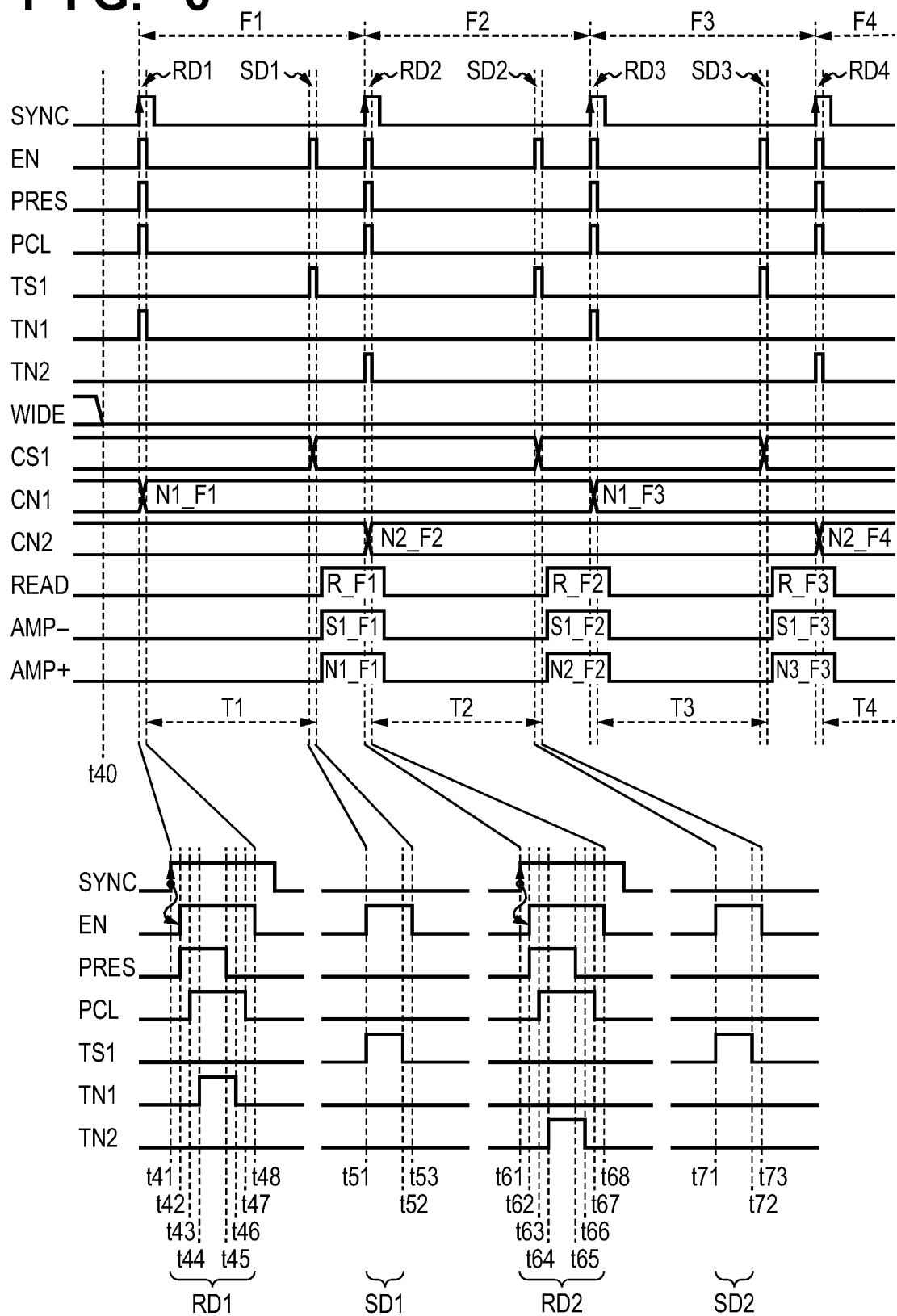
FIG. 6 is a timing chart for explaining a modification of the method of driving the radiation imaging apparatus according to the second embodiment of the present invention.

As shown in FIG. 6, readout (for example, R_F1) that has started from a given frame by the signal readout unit 20 may continue to the next frame depending on the durations of the accumulation periods T1 to T4 or the duration of the readout period.

Third Embodiment

Figure 7:
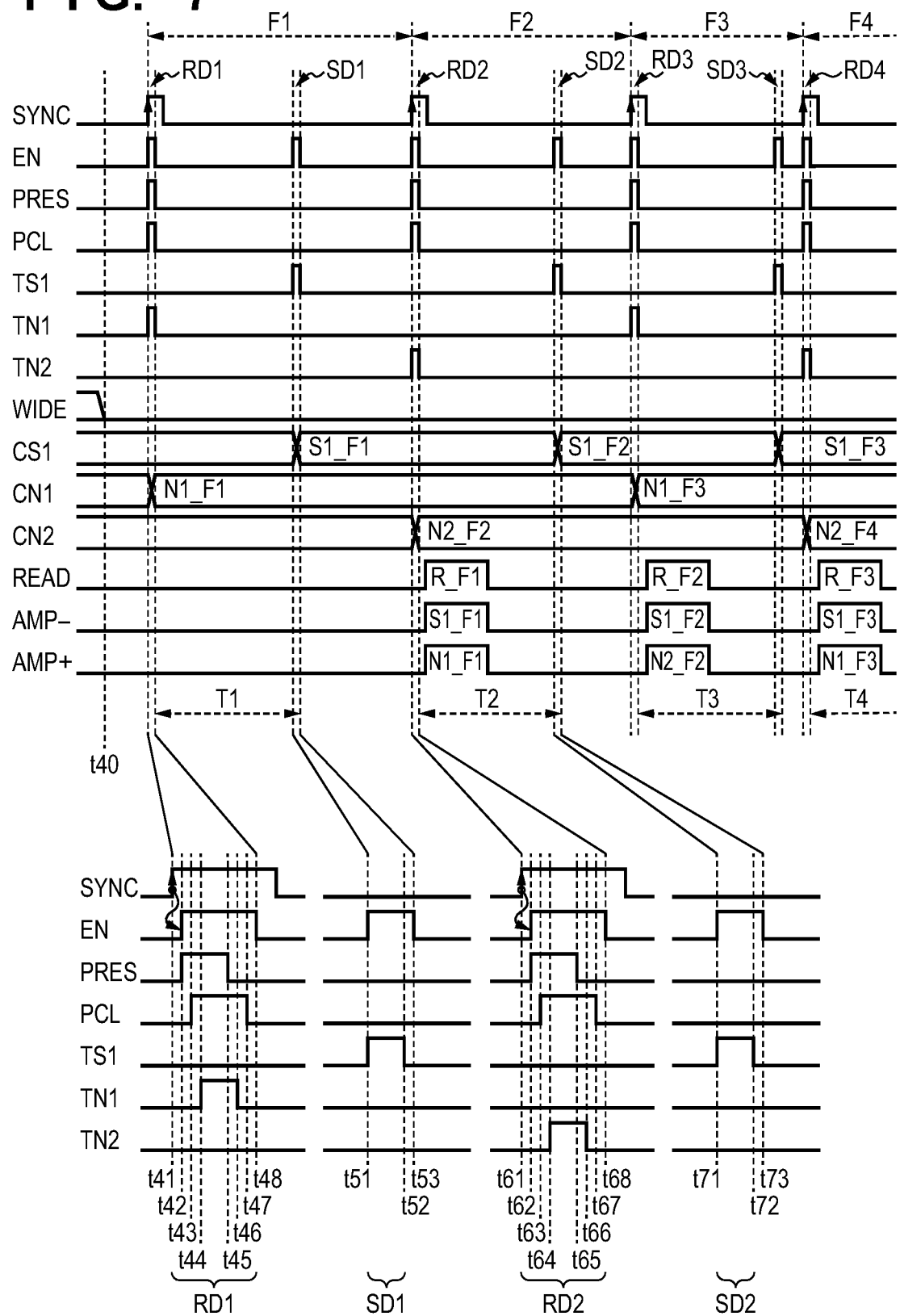
FIG. 7 is a timing chart for explaining a method of driving a radiation imaging apparatus according to the third embodiment of the present invention.

A method of driving a radiation imaging apparatus 100 according to the third embodiment will be described with reference to FIG. 7. The hardware arrangement of the radiation imaging apparatus 100 can be similar to that in the first embodiment and a repetitive description thereof will be omitted. A difference between the second and third embodiments will be mainly explained. The driving method in FIG. 7 will be explained in a case in which an imaging mode in which the frame rate is variable and the accumulation period is shorter than a maximum one within the frame period is set. In the example of FIG. 7, the frame rate increases stepwise. The duration of the frame period shortens stepwise from the frame period F1 toward the frame period F4.

The third embodiment is the same as the second embodiment in reset drivings RD1 to RD4 and sample and hold drivings SD1 to SD3, but is different in timings to read out a pixel signal and an offset signal. In the second embodiment, the signal readout unit 20 starts reading out the pixel signal S1 a predetermined time after the start of holding the pixel signal S1. In the third embodiment, a signal readout unit 20 starts reading out a pixel signal S1 a predetermined time after the end of reset driving in the next frame period (that is, after generation of an offset signal in the next frame period). For example, a pixel signal S1_F1 generated in the frame period F1 is read out a predetermined time after the end of the reset driving RD2 in the next frame period F2. Since accumulation periods T1 to T4 are constant, the signal readout unit 20 starts reading out the pixel signal S1 a time corresponding to a change of the duration of the frame period after the start of holding the pixel signal S1.

In this manner, reset driving RD is not executed during a readout period READ. This prevents generation of noise or an artifact in a frame image.

The above-described solution reduces a flicker.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A radiation imaging apparatus that generates a plurality of frame images, comprising:
    a plurality of pixels, each pixel including:
        a signal generation unit configured to generate a pixel signal based on charges generated and accumulated in accordance with radiation;
        a reset unit configured to cause the signal generation unit to generate an offset signal by resetting the signal generation unit to a state before the accumulation of charges; and
        a holding unit capable of holding a signal;
    a control unit configured to control each pixel to generate the pixel signal and the offset signal in every frame period and hold the pixel signal and the offset signal in the holding unit; and
    a readout unit configured to read out, from the holding unit, the offset signal generated in a frame period and the pixel signal generated in accordance with charges accumulated subsequently to the generation of the offset signal, and calculate a difference between the readout offset signal and pixel signal.

2. The radiation imaging apparatus according to claim 1, wherein the holding unit can simultaneously hold the offset signal generated in a frame period and the offset signal generated in a next frame period.

3. The radiation imaging apparatus according to claim 2, wherein the readout unit reads out the offset signal and the pixel signal from the holding unit at a same timing.

4. The radiation imaging apparatus according to claim 2, wherein the readout unit reads out the offset signal generated in a frame period after generation of the offset signal in a next frame period.

5. The radiation imaging apparatus according to claim 1, wherein
    the holding unit includes two sample and hold circuits, and
    the control unit controls each pixel to hold the offset signals alternately in the two sample and hold circuits in every frame period.

6. The radiation imaging apparatus according claim 1, wherein the readout unit starts reading out the pixel signal a time corresponding to a change of a duration of the frame period after a start of holding the pixel signal.

7. The radiation imaging apparatus according to claim 1, wherein the readout unit starts reading out the pixel signal a predetermined time after a start of holding the pixel signal.

8. The radiation imaging apparatus according to claim 1, wherein the control unit controls the respective pixels to generate the pixel signals and the offset signals at a same timing.

9. The radiation imaging apparatus according to claim 1, wherein
    the signal generation unit includes:
        a conversion unit configured to convert radiation into charges; and
        a clamp capacitor configured to receive a signal generated by the conversion unit, and
    the reset unit resets the signal generation unit by resetting a potential of the conversion unit and a potential of an output terminal of the clamp capacitor.

10. A radiation imaging system comprising:
    a radiation imaging apparatus according to claim 1; and a signal processing unit configured to process a signal obtained by the radiation imaging apparatus.

11. A method of driving a radiation imaging apparatus that includes a plurality of pixels and generates a plurality of frame images, wherein each of the plurality of pixels includes
- a signal generation unit configured to generate a pixel signal based on charges generated and accumulated in accordance with radiation,
- a reset unit configured to cause the signal generation unit to generate an offset signal by resetting the signal generation unit to a state before the accumulation of charges, and
- a holding unit capable of holding a signal, and the method comprises steps of:
- controlling each pixel to generate the pixel signal and the offset signal in every frame period and hold the pixel signal and the offset signal in the holding unit; and
- reading out, from the holding unit, the offset signal generated in a frame period and the pixel signal generated in accordance with charges accumulated subsequently to the generation of the offset signal, and calculating a difference between the readout offset signal and pixel signal.

* * * * *